US012589971B2

(12) United States Patent
Hsu et al.

(10) Patent No.: US 12,589,971 B2
(45) Date of Patent: Mar. 31, 2026

(54) SYSTEM AND METHOD FOR DYNAMICALLY MODIFYING A CAPACITY LIMIT OF AN ELEVATOR CAR

(71) Applicant: Otis Elevator Company, Farmington, CT (US)

(72) Inventors: Arthur Hsu, South Glastonbury, CT (US); Yi Eason Xiao, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1151 days.

(21) Appl. No.: 17/537,754

(22) Filed: Nov. 30, 2021

(65) Prior Publication Data

US 2022/0332540 A1 Oct. 20, 2022

(30) Foreign Application Priority Data

Apr. 19, 2021 (CN) ........................ 202110418506.4

(51) Int. Cl.
*B66B 1/34* (2006.01)
*B66B 1/24* (2006.01)

(52) U.S. Cl.
CPC .......... *B66B 1/3407* (2013.01); *B66B 1/2416* (2013.01); *B66B 1/3446* (2013.01); *B66B 1/3476* (2013.01)

(58) Field of Classification Search
CPC ..... B66B 1/24–2466; B66B 1/28; B66B 1/30; B66B 1/34–3415; B66B 1/3446–3461;
(Continued)

(56) References Cited

U.S. PATENT DOCUMENTS

2015/0323915 A1 11/2015 Warren et al.
2018/0044132 A1 2/2018 Fauconnet
(Continued)

FOREIGN PATENT DOCUMENTS

CN 106995168 A 8/2017
DE 112018007777 T5 3/2021
(Continued)

OTHER PUBLICATIONS

European Search Report; Issued: May 24, 2022; Application No. 21213829.1; Filed: Dec. 10, 2021; 8 pages.

*Primary Examiner* — Christopher Uhlir
(74) *Attorney, Agent, or Firm* — CANTOR COLBURN LLP

(57) ABSTRACT

Disclosed is an elevator system having: a controller; an elevator car operationally connected to the controller; a first sensor configured to provide first sensor data to the controller, wherein the controller is configured to identify a capacity parameter of the elevator car, wherein the capacity parameter includes one or more of: loaded weight; volume of available space; or volume of occupied space; a second sensor configured to provide second sensor data to the controller, wherein the controller is configured to determine that passengers remain outside the elevator car when the elevator car is stopped at a landing and its elevator doors are open; and wherein from the first sensor data and the second sensor data, the controller is configured to determine a reduced capacity limit for the elevator car as a function of the capacity parameter.

18 Claims, 7 Drawing Sheets

(58) Field of Classification Search
CPC .......... B66B 1/3476; B66B 5/00–0018; B66B 5/0037
See application file for complete search history.

(56) References Cited

U.S. PATENT DOCUMENTS

| | | | | |
|---|---|---|---|---|
| 2018/0093859 | A1* | 4/2018 | Stranieri | B66B 1/28 |
| 2020/0055692 | A1* | 2/2020 | Marpu | B66B 1/2408 |
| 2021/0221648 | A1* | 7/2021 | Wang | B66B 13/26 |
| 2022/0185625 | A1* | 6/2022 | One | G06N 3/0464 |
| 2023/0035019 | A1* | 2/2023 | Hawkins | B66B 3/002 |
| 2023/0391583 | A1* | 12/2023 | Saito | B66B 3/02 |

FOREIGN PATENT DOCUMENTS

| | | | |
|---|---|---|---|
| JP | 2008290805 | A | 12/2008 |
| JP | 2012096901 | A | 5/2012 |
| JP | 2020196548 | A | 12/2020 |
| WO | 2020031231 | A1 | 2/2020 |

* cited by examiner

SYSTEM AND METHOD FOR DYNAMICALLY MODIFYING A CAPACITY LIMIT OF AN ELEVATOR CAR

FOREIGN PRIORITY

This application claims priority to Chinese Patent Application No. 202110418506.4, filed Apr. 19, 2021, and all the benefits accruing therefrom under 35 U.S.C. § 119, the contents of which in its entirety are herein incorporated by reference.

BACKGROUND

The embodiments are directed to elevator systems and more specifically to a system and method for dynamically modifying a capacity limit of an elevator car.

Elevator cars may be controlled to skip new floor call(s) upon reaching an occupational capacity limit. Reduced capacity limit may be based on a number a number of calls. However, passengers may avoid entering an elevator car even when it is below the reduced capacity limit, reducing overall system efficiency.

BRIEF SUMMARY

Disclosed is an elevator system including: a controller; an elevator car operationally connected to the controller; a first sensor configured to provide first sensor data to the controller, wherein the controller is configured to identify a capacity parameter of the elevator car, wherein the capacity parameter includes one or more of: loaded weight; volume of available space; or volume of occupied space; a second sensor configured to provide second sensor data to the controller, wherein the controller is configured to determine that passengers remain outside the elevator car when the elevator car is stopped at a landing and its elevator doors are open; and wherein from the first sensor data and the second sensor data, the controller is configured to determine a reduced capacity limit for the elevator car as a function of the capacity parameter.

In addition to one or more aspect of the system, or as an alternate, the controller, the first sensor and the second sensor are configured to communicate with each other over a wireless network.

In addition to one or more aspect of the system, or as an alternate, the controller is configured to determine the reduced capacity limit by applying a predetermined multiplier to the capacity parameter.

In addition to one or more aspect of the system, or as an alternate, the capacity parameter further includes one or more of time of day, season, geographic location, occupancy type and building utilization.

In addition to one or more aspect of the system, or as an alternate, the occupancy type is one or more of cargo and passenger.

In addition to one or more aspect of the system, or as an alternate, the controller is configured to control the elevator car to disregard calls for service when the elevator car is at or above the reduced capacity limit.

In addition to one or more aspect of the system, or as an alternate, the first sensor is located onboard the elevator car and is configured to communicate with the controller directly or via a cloud service, and the first sensor data is processed in whole or part at one or more of the first sensor, the cloud service and the controller.

In addition to one or more aspect of the system, or as an alternate, one or more of passenger count, the volume of available space and volume of occupied space is derived from processing the first sensor data.

In addition to one or more aspect of the system, or as an alternate, the second sensor is onboard the elevator car or located at the landing; and the second sensor communicates with the controller directly or via the cloud service, and the second sensor data is processed in whole or part at one or more of the second sensor, the cloud service and the controller.

In addition to one or more aspect of the system, or as an alternate, the second sensor is a motion sensor or depth sensor located on the landing.

In addition to one or more aspect of the system, or as an alternate, when determining the reduced capacity limit, controller is configured for: accumulating data related to passengers entering the elevator in response to hall calls while the elevator car is near its design capacity limit or previously set reduced capacity limit; setting the reduced capacity limit to correlate with a predetermined boarding probability and setting a tolerance range around the reduced capacity limit; determining whether passengers enter the elevator car in response to hall calls; upon determining that passengers enter the elevator in response to hall calls, increasing the reduced capacity limit by half the tolerance range to an upper capacity tolerance, otherwise decreasing the reduced capacity limit by half the tolerance range to a lower capacity tolerance; determining whether the boarding probability within acceptable limits over time; and upon determining that the boarding probability is outside of acceptable limits over time, modifying one or both of the tolerance range and the reduced capacity limit.

Further disclosed is a method of controlling an elevator car of an elevator system with a controller that is operationally connected to the elevator car, the method including: identifying, at the controller from first sensor data communicated via a first sensor, a capacity parameter of the elevator car, wherein the capacity parameter includes at least one of: loaded weight; volume of available space; or volume of occupied space; determining, at the controller from second sensor data communicated via a second sensor, that passengers remain outside the elevator car when the elevator car is stopped at a landing and its elevator doors are open; and determining, at the controller from the first sensor data and the second sensor data, a reduced capacity limit for the elevator car as a function of the capacity parameter.

In addition to one or more aspect of the method, or as an alternate, the controller, the first sensor and the second sensor communicate with each other over a wireless network.

In addition to one or more aspect of the method, or as an alternate, determining the reduced capacity limit includes applying a predetermined multiplier to the capacity parameter.

In addition to one or more aspect of the method, or as an alternate, the capacity parameter further includes one or more of time of day, season, geographic location, occupancy type and building utilization.

In addition to one or more aspect of the method, or as an alternate, the occupancy type is one or more of cargo and passengers.

In addition to one or more aspect of the method, or as an alternate, the method further includes: controlling the elevator car, by the controller, to disregard calls for service when the elevator car is at or above the reduced capacity limit.

In addition to one or more aspect of the method, or as an alternate, the first sensor is located onboard the elevator car; and the method includes: communicating, between the controller and the first sensor, directly or via a cloud service, and processing the first sensor data in whole or part at one or more of the first sensor, the cloud service and the controller.

In addition to one or more aspect of the method, or as an alternate, the method further includes: determining, from the first sensor data, one or more of passenger count, the volume of available space and volume of occupied space.

In addition to one or more aspect of the method, or as an alternate, the second sensor is onboard the elevator car or located at the landing; and the method further includes: communicating, between the second sensor and the controller, directly or via the cloud service, and processing the second sensor data in whole or part at one or more of the second sensor, the cloud service and the controller.

In addition to one or more aspect of the method, or as an alternate, the second sensor includes a motion sensor or depth sensor located on the landing.

In addition to one or more aspect of the method, or as an alternate, when determining the reduce capacity limit, the method includes the controller: accumulating data related to passengers entering the elevator in response to hall calls while the elevator car is near its design capacity limit or previously determined reduced capacity limit; setting the reduced capacity limit to correlate with a predetermined boarding probability and setting a tolerance range around the reduced capacity limit; determining whether passengers enter the elevator car in response to hall calls; upon determining that passengers enter the elevator in response to hall calls, increasing the reduced capacity limit by half the tolerance range to an upper capacity tolerance, otherwise decreasing the reduced capacity limit by half the tolerance range to a lower capacity tolerance; determining whether the boarding probability within acceptable limits over time; and upon determining that the boarding probability is outside of acceptable limits over time, modifying one or both of the tolerance range and the reduced capacity limit.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
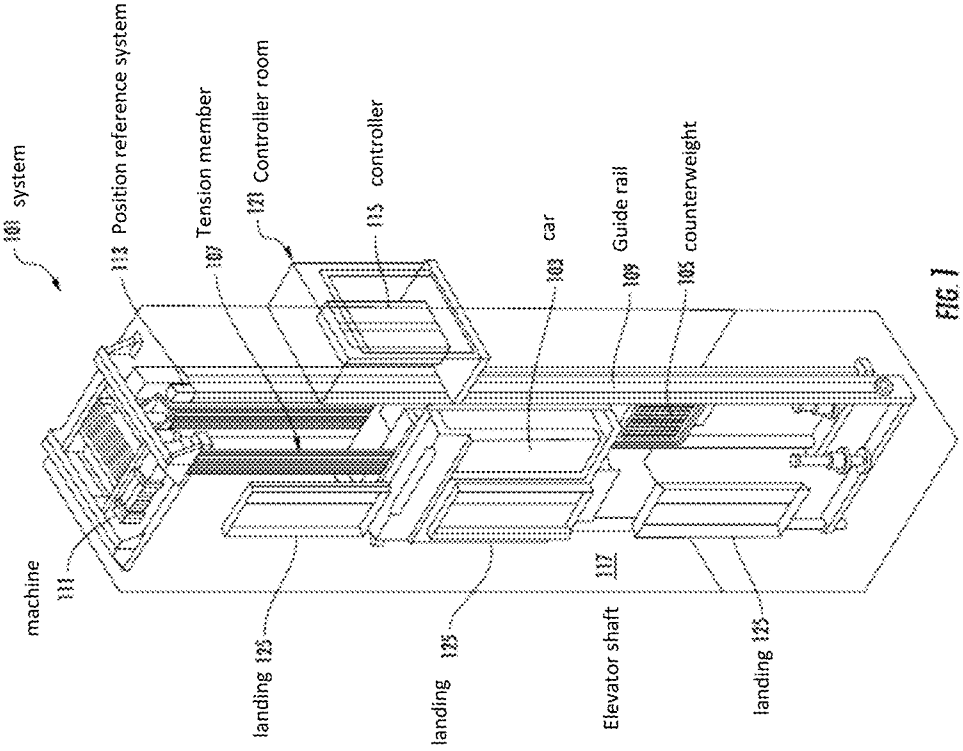
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail (or rail system) 109, a machine (or machine system) 111, a position reference system 113, and an electronic elevator controller (controller) 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft (or hoistway) 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. Embodiments may also be employed in ropeless elevator systems using self-propelled elevator cars (e.g., elevator cars equipped with friction wheels, pinch wheels or traction wheels). FIG. 1 is merely a non-limiting example presented for illustrative and explanatory purposes.

For optimizing elevator car dispatching performance, it may be valuable for the system to know the actual available space (volume) or weight in the elevator car (otherwise referred to as a cab). The system may utilize this information to estimate a passenger count or passenger or cargo volume, and to estimate an available space, so as not to assign passengers to a car that they will not enter due to over-crowding. A capacity (or occupancy) limit may be a function of geography, building type (e.g., commercial/residential), time of day, season, etc., as indicated below.

Figure 2:
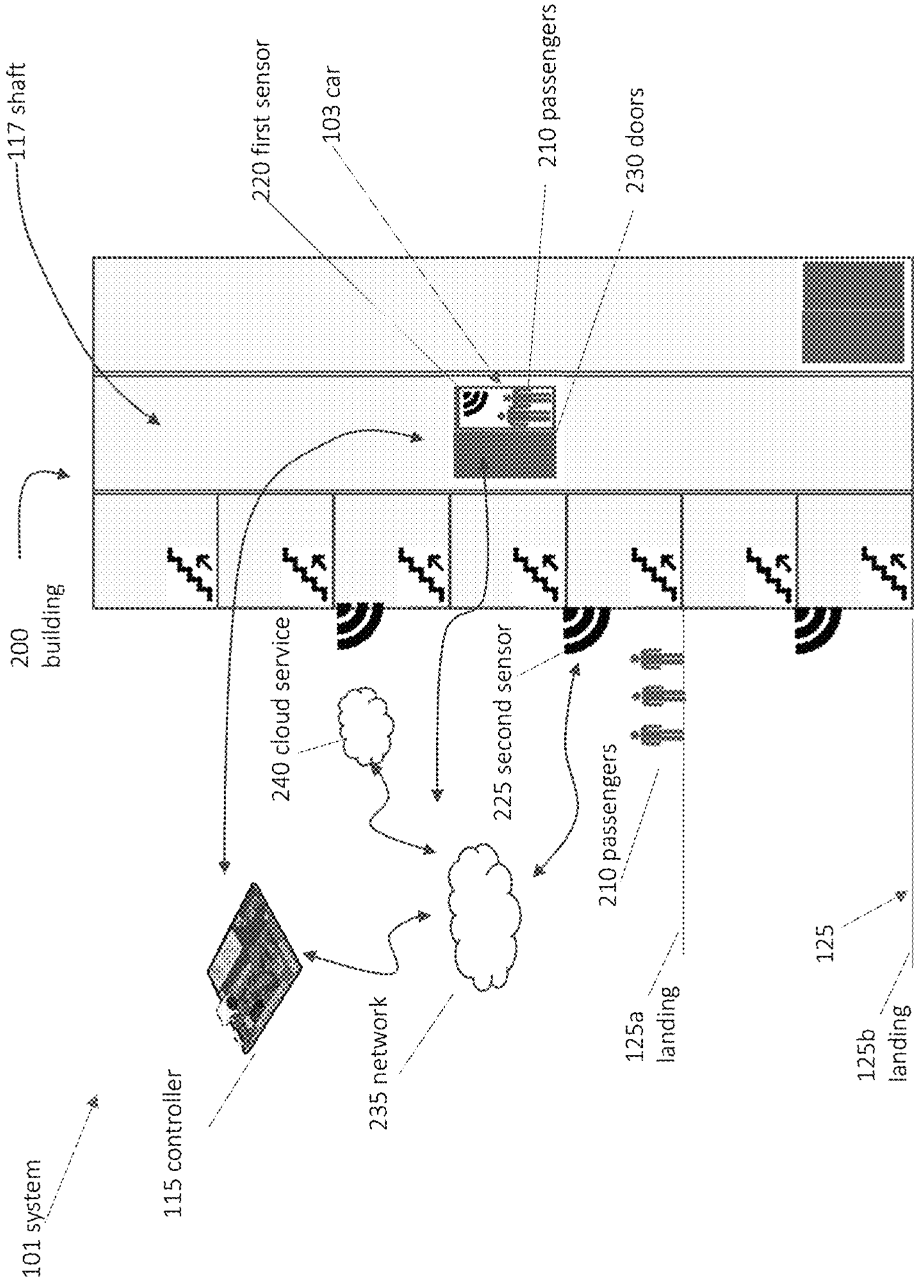
FIG. 2 is a further schematic illustration of the elevator system that is configured to dynamically modify a capacity limit of an elevator car.

Specifically, turning to FIG. 2, the elevator system 101 is located in a building 200 and includes the elevator car 103 that travels in the shaft 117 between landings generally labeled 125, and including e.g., first and second landings 125*a*, 125*b*, to pick up and drop off passengers 210. The elevator system 101 includes the controller 115 and the elevator car 103 operationally connected to the controller 115. The controller 115 may be onboard the elevator car or may be a dispatch controller located remotely as show in FIG. 1.

A first sensor 220 may be configured to provide first sensor data, indicative of current elevator car capacity or occupancy as indicated below, to the controller 115. The first sensor 220 may be located in the car 103 and may be, for example, a camera, a depth sensor, a floor pressure sensor, etc. Alternatively, the first sensor 220 may be located elsewhere. For example, the first sensor 220 may be a tension measuring system on hoist rope, illustrated as the tension member 107 in FIG. 1.

From the first sensor data, the controller 115 may be configured to identify a capacity parameter (or occupancy parameter) of the elevator car 103. The capacity parameter may represent information about the conditions of the elevator utilization that enable the controller 115 to determine a modified or reduced capacity limit. The capacity parameter may be loaded weight, volume of available space or volume of occupied space.

For example, if the first sensor 220 is a pressure or weight sensing implement, then the first sensor data may be utilized to identify loaded weight in the elevator car 103. Alternatively, if the first sensor 220 is a camera or depth sensor, then the first sensor data may be utilized to identify an occupied volume in the elevator car 103. The first sensor 220 may be configured to communicate with the controller 115 directly, e.g., via a wired or wireless network connection 235 as indicated below, or via a cloud service 240. The first sensor data may be completely or partially processed at the first sensor 220 by edge computing, or at the cloud service 240 or controller 115. The first sensor data may be transmitted entirely or partially in a raw format and portions of the first sensor data may be stitched together at different processing points along the transmission path between the first sensor 220 and the controller 115.

A second sensor 225 may be configured to provide second sensor data, indicative of passenger activity at a landing 125 reached by the car 103, to the controller 115. The second sensor 225 may also be camera, depth sensor or floor pressure sensor, located at the landing 125. Alternatively, the second sensor 225 may be a light curtain in the elevator door and/or hall door, etc., for example elevator doors 230 in FIG. 2. In one embodiment, the first sensor is utilized to obtain this information instead of a second sensor.

From the second sensor data, the controller 115 may be configured to determine that at least one passenger remains outside the elevator car 103, e.g., at the landing 125, when the elevator car 103 is stopped at the landing 125, throughout the period that the elevator doors 230 are open and when the doors close. For example the controller 115 may utilize standard protocols for determining when to open and close the elevator doors 230 at the landing 125. The controller 115, with the second sensor data, may then determine that at least one passenger at the landing 125 did not board the elevator car 103. This may be a binary determination, e.g., identifying whether or not a passenger is at the landing 125 when the doors close. The determination may also account for whether and how many passengers entered and exited the elevator car while the elevator car is at the landing 125. These determinations may account for, e.g., transient changes or differentials between initial and final passenger volume or weight at the landing while the elevator doors are opened. The second sensor 225 may be configured to communicate with the controller 115 directly, e.g., via the wired or wireless network connection 235 as indicated below, or via the cloud service 240. The second sensor data may be completely or partially processed at the second sensor 225 by edge computing, or at the cloud service 240 or controller 115. The second sensor data may be transmitted entirely or partially in a raw format and portions of the second sensor data may be stitched together at different processing points along the transmission path between the second sensor 225 and the controller 115.

Based on the first sensor data and preprogrammed capacity data, the controller 115 may determine that the elevator car 103 has available capacity for more passengers. However, by also accounting for the second data, the controller 115 may determine that the elevator has reached its capacity base on passenger preference. From the first sensor data and the second sensor data, in comparison, the controller 115 may be configured to determine a reduced capacity limit for the elevator car 103 as a function of the capacity parameter (actual loaded weight, occupied or available space). Thus, the controller 115 is configured to dynamically modify, e.g., reduce, the capacity limit of the elevator car 103 by utilizing the first sensor data and the second sensor data.

Figure 3:
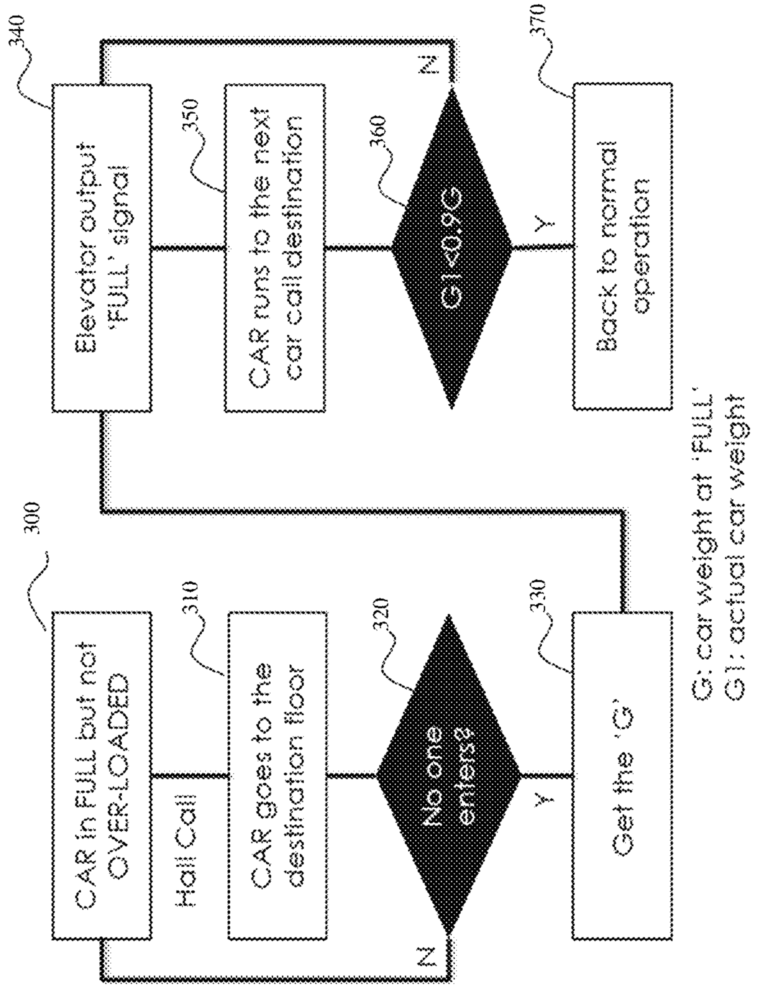
FIG. 3 is a flowchart showing aspects of a method of dynamically modifying a capacity limit of an elevator car.

According to an embodiment, the controller 115 may be configured to determine the reduced capacity limit by applying a predetermined multiplier to the capacity parameter. In an illustrative example, turning to FIG. 3, during an elevator rush hour, a reduced capacity limit G1 may be calculated based on a determined capacity parameter G, in which case the car is considered at or about FULL but not OVERLOADED. At block 300, the car 103 is already at or about full but not over loaded status. At block 310, someone at a landing presses the hall call in another floor and the car reaches to the floor and the elevator door opens. At block 320 a determination is made as to whether no one enters (or whether at least one passenger stays on the landing). If the determination is "no" because passengers enter (and no one stays on the landing) then the controller goes back to block 300. If the determination is "yes" because passengers do not enter (or at least one passenger stays behind), then the capacity parameter for the elevator car 103 at that time (e.g., G) is obtained at block 330. The elevator car 103 outputs a full signal at block 340 and ignores hall calls. The car 103 runs to the next car call destination per block 350. When passengers leave the car 103, and the elevator is still outputting a "FULL" signal, there is a determination at block 360 of whether the capacity parameter is less than the reduced capacity limit is (G1) is, for example, less than 0.9 (or another reduction multiple) of G. If the determination is "no" at block 360 then the elevator remains full per block 340 and will only run to car calls, e.g., not hall calls per block 350. If the determination at block 360 is "yes", then per block 370 the operation status returns to normal operation, e.g., the car is not overloaded, even if at or near full. As can be appreciated, the controller 115 may be configured to self-determine that the reduced capacity limit is function (e.g., less than or equal to ninety percent, or other reduction multiple) of a previously programmed or determined reduced capacity limit instead of being a function of the then-measured capacity parameter.

As indicated above, the capacity parameter represents information about the conditions of the elevator utilization that enable the controller to determine a modified or reduced capacity limit. According to an embodiment, the capacity parameter may also include time of day, season, geographic location, occupancy type and building utilization. According to an embodiment, the occupancy type may be one or more of cargo, passenger and robot, which may be a cleaning bot or other robot. That is, the embodiments may consider more than merely the available space by weight or volume. Depending on the other identified variables, the system is able to more robustly identify when passengers in certain cohorts or passengers subject to certain environmental conditions may statistically feel the elevator car is too crowded to enter. Such embodiments may be configured to learn the practical limits which, even for the same-sized cab, varies geographically and by usage of the building (e.g. student dorm vs hospital). Thus, depending on these conditions, the controller 115 may reduce the capacity limit by a predetermined reduction multiple without first going through the process shown in FIG. 3. Instead, the process shown in FIG. 3 may be utilized to fine-tune the reduced capacity limit that has been otherwise modified (reduced) based on time of day, season, geographic location, occupancy type and building utilization.

According to an embodiment, as indicated, the controller 115 may be configured to utilize the reduced capacity limit and control the elevator car 103 to disregard (e.g., not answer or bypass) calls for service (hall calls) during such times that the elevator car 103 is at or above the reduced capacity limit.

According to an embodiment, as indicated, the first sensor 220 may be onboard the elevator car 103 and may be configured to communicate with the controller 115 directly, e.g., via the wired or wireless network connection 235 as indicated below, or via the cloud service 240. The first sensor data may be processed in whole or part at one or more of the first sensor 220, the cloud service 240 and the controller 115. Processed portions may be stitched together at the controller 115 for form compiled data. According to an embodiment, one or more of passenger count, volume of available space or volume of occupied space may be derived from processing the first sensor data.

According to an embodiment, the second sensor 225 may be onboard the elevator car 103 or located at the landing 125. The second sensor 225 may communicate with the controller 115, directly or via the cloud service 240. The second sensor data may be processed in whole or part at one or more of the second sensor, the cloud service 240 and the controller 115. Processed portions may be stitched together at the controller 115 for form compiled data. According to an embodiment, the second sensor 225 may be a motion sensor or depth sensor located onboard the elevator car 103, such as in the elevator doors 230, or on the landing. The second sensor 225 may also be camera, depth sensor or floor pressure sensor, located at the landing 125. Alternatively, the second sensor 225 may be a light curtain in the elevator door and/or hall door, etc., for example elevator doors 230 in FIG. 2. The depth sensor may be configured to detect shapes of people, which the controller 115 identifies as people waiting at the landing.

Figure 4:
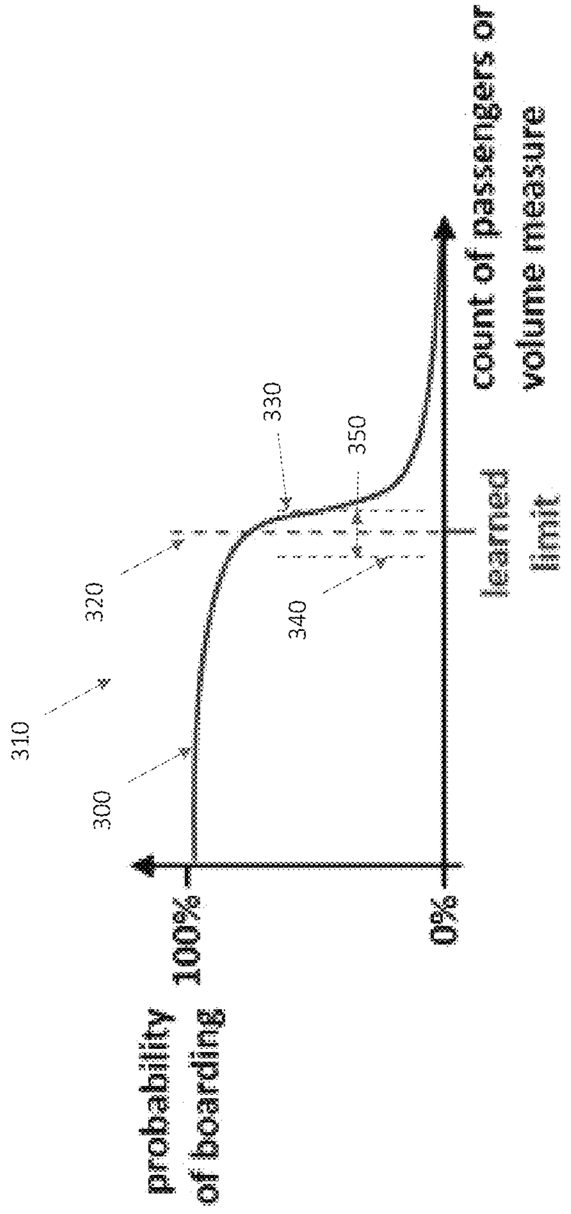
FIG. 4 is a probability curve developed by the system for dynamically modifying a reduced capacity limit of an elevator car.

The above embodiments provide for the system to self-learn the effective load limit. The system detects cases when at least one passenger does not board the car, utilizing for example volume sensors both in the car and the hall so the system can sense if some passengers were left behind in the hall. By detecting at substantially every boarding instance (i.e., hall call) whether or not at least one person is left behind, the system can build a probability curve 300 shown in FIG. 4, which graphs the probably of passengers entering the elevator car (Y axis) based on, for example, the current passenger count or measured volume (used or available) (X axis) in the elevator car.

The system goal is to learn approximately where the curve takes a sharp downward, e.g., the learned limit (vertical line 320), which is the reduced capacity limit, which may represent a 90% boarding probability. When the car 103 is lightly loaded (left side 310 of graph 300), there is a high probability that someone will board the car. As the car becomes fuller, the probability decreases. The goal may be to have passengers board the elevator car 90% of the time a hall call is answered.

With each complete boarding the system may adjust the curve rightwards to an upper capacity tolerance or upper limit 330 to increase the reduced capacity limit. In addition, with each incomplete boarding, the system may adjust the curve leftwards by substantially the same amount as adjusted rightwards to a lower capacity tolerance or lower limit 340 to decrease the reduced capacity limit. The amount of adjusting to the left or right of the learned limit 320 may define an adjustment range or tolerance range 350 that may itself be learned and modified over time so that minimal overall adjustments are required to obtain the 90% (or thereabout) boarding probability. If the differential size of the tolerance range 350, between the reduced capacity limits 330/340, is too large, then the probability of a passenger boarding may drop to an unacceptable level, in which case the tolerance range 350 may be made smaller. If the boarding probability goes too far above 90%, the elevator may not be carrying enough passengers, which is also undesirable, in which case the tolerance range 350 may be made larger and/or the learned limit 320 may shift to increase or decrease the reduced capacity limit. The size of the tolerance range 350 may initially be +/−1% of the boarding probability. Adjustments to the tolerance range 350 and movement of the learned limit 320 may be in increments of single percentages of the boarding probability, as one example. It should be appreciated that the boarding probability and tolerance range identified herein are only exemplary, and the true values for each could be higher or lower than those identified herein.

Figure 5:
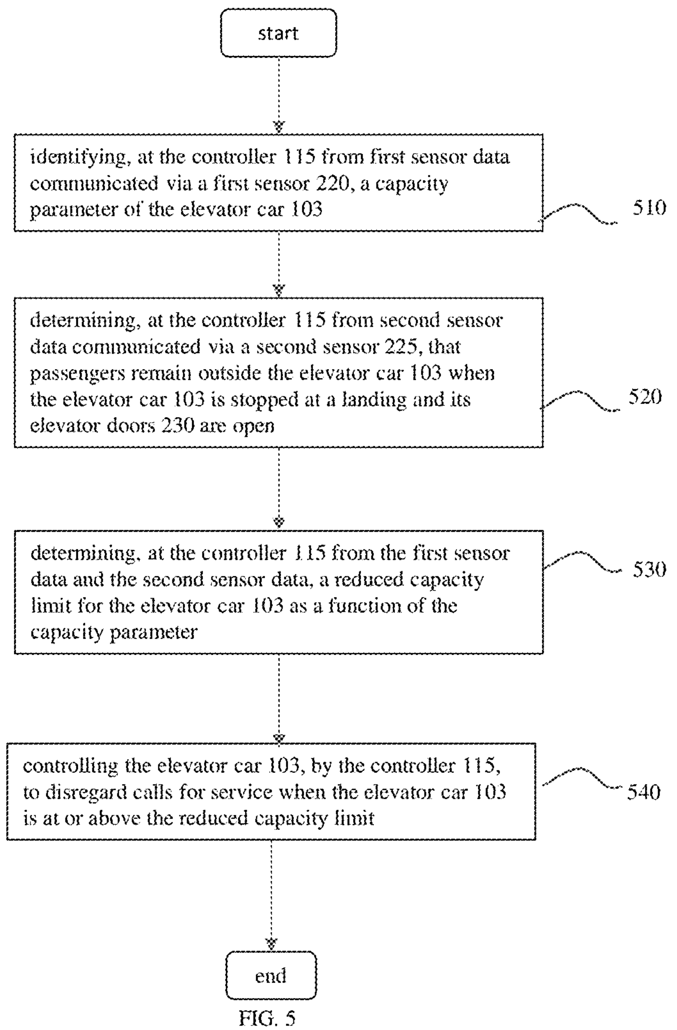
FIGS. 5-9 are additional flowcharts showing aspects of a method of dynamically modifying a reduced capacity limit of an elevator car.

Further disclosed is a method of controlling an elevator car 103 of an elevator system 101 with a controller 115 that may be operationally connected to the elevator car 103. Referring to FIG. 5, as shown in block 510, the method may include identifying, at the controller 115 from first sensor data communicated via a first sensor 220, a capacity parameter of the elevator car 103. As indicated, the capacity parameter may be: loaded weight; volume of available space; or volume of occupied space. In one embodiment, the capacity parameter may further include one or more of time of day, season, geographic location, occupancy type and building utilization. The occupancy type may be one or more of cargo and passengers. Thus, depending on these conditions, the controller 115 may reduce the capacity limit by a predetermined reduction multiple without first going through the process shown in FIG. 3. Instead, the process shown in FIG. 3 may be utilized to fine-tune the capacity limit that has been otherwise modified (reduced) based on time of day, season, geographic location, occupancy type and building utilization. As shown in block 520 the method may include determining, at the controller 115 from second sensor data communicated via a second sensor 225, that passengers remain outside the elevator car 103 when the elevator car 103 is stopped at a landing and its elevator doors 230 are open. In one embodiment, the controller 115, the first sensor 220 and the second sensor 225 communicate with each other over a wireless network 235 of the type identified below. As shown in block 530, the method may include determining, at the controller 115 from the first sensor data and the second sensor data, a reduced capacity limit (e.g., relative to a design maximum capacity limit or previously determined reduce capacity limit) for the elevator car 103 as a function of the capacity parameter. For example, the capacity parameter may be a measured weight when people are not entering the elevator and the capacity limit may be a predetermined reduction multiple of the capacity parameter. In one embodiment, as shown in block 540, the method may include controlling the elevator car 103, by the controller 115, to disregard calls for service when the elevator car 103 is at or above the reduced capacity limit. In some embodiments, the system may continue to run to hall calls as long as at least one person boards the elevator at a last hall call.

Figure 6:
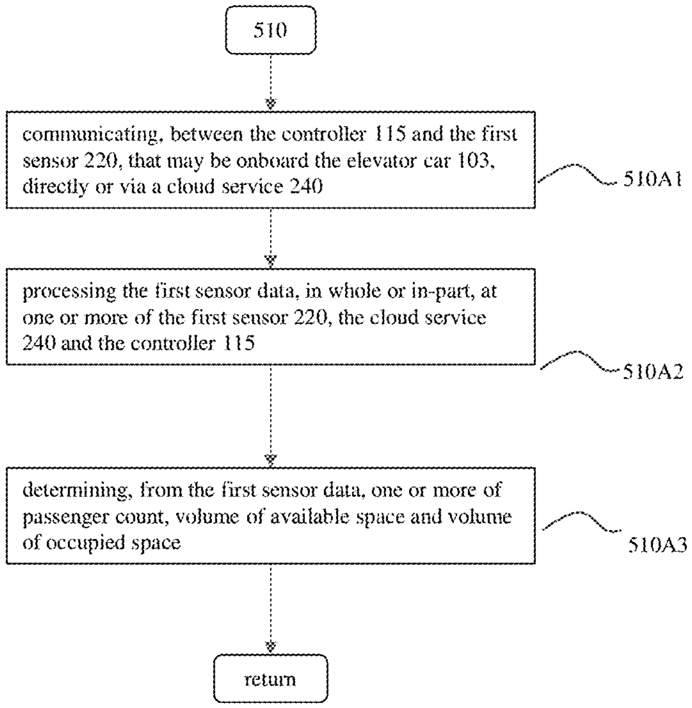

As shown in FIG. 6, in one embodiment, block 510 may be further defined by block 510A1, which identifies that the method may include communicating, between the controller 115 and the first sensor 220, that may be onboard the elevator car 103, directly or via a cloud service 240. As shown in block 510A2, the method may include processing the first sensor data, in whole or in-part, at one or more of the first sensor 220, the cloud service 240 and the controller 115. Processed portions may be stitched together at the controller 115 for form compiled data. As shown in block 510A3, the method may include determining, from the first sensor data, one or more of passenger count, volume of available space and volume of occupied space.

Figure 7:
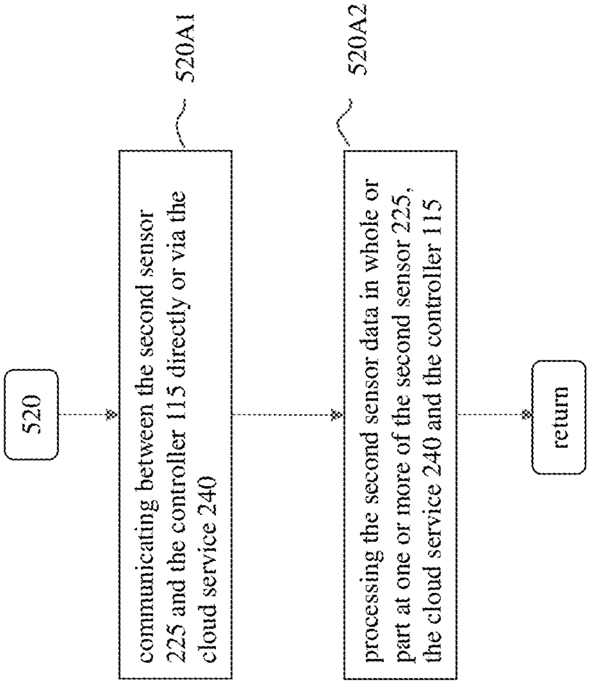

With reference to FIG. 7, as indicated, the second sensor 225 may be onboard the elevator car 103 or located at the landing 125. In one embodiment, block 520 may be further defined by block 520A1, which identifies that the method may include communicating between the second sensor 225 and the controller 115 directly or via the cloud service 240. As shown in block 520A2, the method may include processing the second sensor data in whole or part at one or more of the second sensor 225, the cloud service 240 and the controller 115. Processed portions may be stitched together at the controller 115 for form compiled data. In one embodiment the second sensor 225 may be a motion sensor or depth sensor located onboard the elevator car 103, or on the landing 225.

Figure 8:
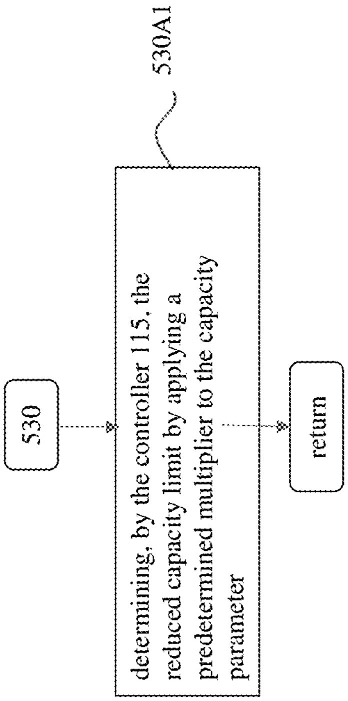
Figure 9:
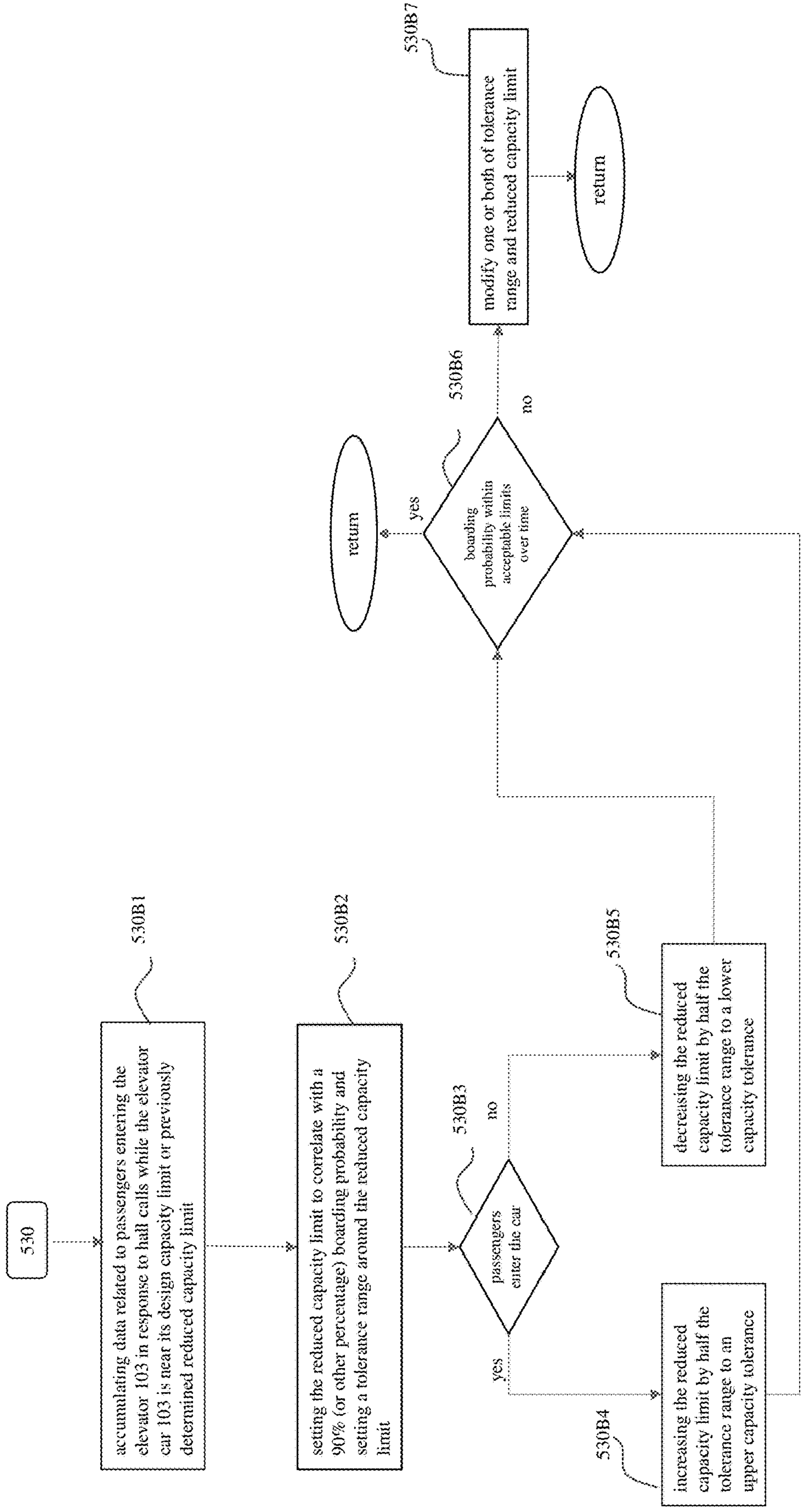

As shown in FIG. 8, in one embodiment, block 530 may be further defined by block 530A1, which identifies that the method may include determining, by the controller 115, the reduced capacity limit by applying a predetermined multiplier to the capacity parameter. In one non-limiting example, the method may include determining, by the controller 115, that the reduced capacity limit may be less than or equal to ninety percent (or other reduction multiple) of a previously programed or determined capacity limit. FIG. 9 shows another embodiment for defining or expanding upon block 530 based on the discussion related to FIG. 4, above. As shown in block 530B1, the method may include the controller 115 accumulating data related to passengers entering the elevator 103 in response to hall calls while the elevator car 103 is near its design capacity limit or previously determined reduced capacity limit (or other selected capacity limit). As shown in block 530B2, the method may include the controller 115 setting a reduced capacity limit that correlates to a 90% (or other percentage) boarding probability that a passenger will enter the car 103. The method may include the controller 115 setting a tolerance range around the reduced capacity limit. The tolerance range may be +/−1% (or other percentage) of the boarding probability. As shown in block 530B3, the method may include the controller determining, at each hall call to which it responds, whether passengers enter the elevator car 103. If they do (yes at 530B3) then as shown in block 530B4 the method may include the controller 115 increasing the reduced capacity limit by half the tolerance range to an upper capacity tolerance. Otherwise (no at 530B3) as shown in block 530B5 the method may include the controller 115 decreasing the reduced capacity limit by half the tolerance range to a lower capacity tolerance. At block 530B6 the method includes determining whether the boarding probability is withing acceptable limits over time, such as hours or days (as non-limiting examples). If so (yes at 530B6) then the controller 115 may return to block 540. Otherwise (no at 530B6) the controller 115, at block 530B7, may modify one or both of the tolerance range (making it larger or smaller) and the reduced capacity limit (increasing or decreasing the limit).

In the above embodiments, the system 101 may utilize an actual available capacity in the elevator car 103 to determine a reduced capacity limit based on a number of passengers, cargo including luggage, time of day, season, geographic location, elevator use, etc. This reduced capacity limit should avoid a condition in which passengers avoid entering the elevator at a landing because it is perceived to be overcrowded. Thus, the system 101 may utilize various types of information to learn the reduced capacity limit, which, even for a same-sized elevator car 103 located elsewhere, varies culturally, geographically and by usage of the building. For example, passengers in one geographic location, such as a crowded city or densely populated university, may accept a more densely packed elevator car, while those in more rural areas or hospitals may expect a less packed elevator car. In addition to measuring the volume or passenger count inside the cab, in order to learn a reduced capacity limit, the system 101 may utilize sensors to detect when passengers in the hallway (or landing) decide not to board the elevator car 103. When passengers do not enter, a practical upper limit to the capacity may be determined, which may be less than a predetermined or preprogrammed capacity limit.

A reduced capacity (e.g., a practical capacity) limit may also be determined by detecting and accounting for occupant types that are given a wider berth, e.g., a robot, an impaired person or a person with supportive machinery. For example, certain cohorts of passenger may be more or less comfortable about riding in elevators with robots as cleaning implements or otherwise. Capacity limits may be based on a time of day, e.g., people may be more willing to squeeze into an elevator during rush hour in an office building. As a further practical example, during a winter rush hour, a capacity limit based on load may be different than a summer rush hour due to the size of bulky clothing. Thus, over-crowding may occur with less loaded weight. In such a situation, the system may learn to reduce the overloading-weight when, for example, the car reaches a floor call and nobody gets on even though the elevator loading is below a predetermined capacity limit. The system may then adjust the capacity limit to, for example, a fractional percentage (such as ninety percent) of the reduced capacity limit, going forward under the same conditions, including time of day, season, geographic location, and type of elevator utilization, such as an office building. The elevator car 103 may thereafter purposely not respond to a floor call when the same conditions are met and the capacity is at or above the reduced capacity limit. Rather in such situations the system may transmit for the elevator car a "FULL" or "NON-STOP" signal to the controller 115, even though the actual weight in the elevator is less than the design capacity limit for loading.

Utilizing this information, the system 101 may learn an effective full load limit that may be specific for a given building and may be adapted for variations in the amount of space taken by each call. The above embodiments may improve dispatching performance by maximizing utilization without assigning passengers to an elevator car 103 that may be deemed by the passengers to be too full.

Sensor data identified herein may be obtained and processed separately, or simultaneously and stitched together, or a combination thereof, and may be processed in a raw or compiled form. The sensor data may be processed on the sensor (e.g. via edge computing), by controllers identified or implicated herein, on a cloud service, or by a combination of one or more of these computing systems. The senor may communicate the data via wired or wireless transmission lines, applying one or more protocols as indicated below.

Wireless connections may apply protocols that include local area network (LAN, or WLAN for wireless LAN) protocols. LAN protocols include WiFi technology, based on the Section 802.11 standards from the Institute of Electrical and Electronics Engineers (IEEE). Other applicable protocols include Low Power WAN (LPWAN), which is a wireless wide area network (WAN) designed to allow long-range communications at a low bit rates, to enable end devices to operate for extended periods of time (years) using battery power. Long Range WAN (LoRaWAN) is one type of LPWAN maintained by the LoRa Alliance and is a media access control (MAC) layer protocol for transferring management and application messages between a network server and application server, respectively. LAN and WAN protocols may be generally considered TCP/IP protocols (transmission control protocol/Internet protocol), used to govern the connection of computer systems to the Internet. Wireless connections may also apply protocols that include private area network (PAN) protocols. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include Zigbee, a technology based on Section 802.15.4 protocols from the IEEE, representing a suite of high-level communication protocols used to create personal area networks with small, low-power digital radios for low-power low-bandwidth needs. Such protocols also include Z-Wave, which is a wireless communications protocol supported by the Z-Wave Alliance that uses a mesh network, applying low-energy radio waves to communicate between devices such as appliances, allowing for wireless control of the same.

Wireless connections may also include radio-frequency identification (RFID) technology, used for communicating with an integrated chip (IC), e.g., on an RFID smartcard. In addition, Sub-1 Ghz RF equipment operates in the ISM (industrial, scientific and medical) spectrum bands below Sub 1 Ghz—typically in the 769-935 MHz, 315 Mhz and the 468 Mhz frequency range. This spectrum band below 1 Ghz is particularly useful for RF IOT (internet of things) applications. The Internet of things (IoT) describes the network of physical objects—"things"—that are embedded with sensors, software, and other technologies for the purpose of connecting and exchanging data with other devices and systems over the Internet. Other LPWAN-IOT technologies include narrowband internet of things (NB-IOT) and Category M1 internet of things (Cat M1-IOT). Wireless communications for the disclosed systems may include cellular, e.g. 2G/3G/4G (etc.). Other wireless platforms based on RFID technologies include Near-Field-Communication (NFC), which is a set of communication protocols for low-speed communications, e.g., to exchange date between electronic devices over a short distance. NFC standards are defined by the ISO/IEC (defined below), the NFC Forum and the GSMA (Global System for Mobile Communications) group. The above is not intended on limiting the scope of applicable wireless technologies.

Wired connections may include connections (cables/interfaces) under RS (recommended standard)-422, also known as the TIA/EIA-422, which is a technical standard supported by the Telecommunications Industry Association (TIA) and which originated by the Electronic Industries Alliance (EIA) that specifies electrical characteristics of a digital signaling circuit. Wired connections may also include (cables/interfaces) under the RS-232 standard for serial communication transmission of data, which formally defines signals connecting between a DTE (data terminal equipment) such as a computer terminal, and a DCE (data circuit-terminating equipment or data communication equipment), such as a modem. Wired connections may also include connections (cables/interfaces) under the Modbus serial communications protocol, managed by the Modbus Organization. Modbus is a master/slave protocol designed for use with its programmable logic controllers (PLCs) and which is a commonly available means of connecting industrial electronic devices. Wireless connections may also include connectors (cables/interfaces) under the PROFibus (Process Field Bus) standard managed by PROFIBUS & PROFINET International (PI). PROFibus which is a standard for fieldbus communication in automation technology, openly published as part of IEC (International Electrotechnical Commission) 61158. Wired communications may also be over a Controller Area Network (CAN) bus. A CAN is a vehicle bus standard that allow microcontrollers and devices to communicate with each other in applications without a host computer. CAN is a message-based protocol released by the International Organization for Standards (ISO). The above is not intended on limiting the scope of applicable wired technologies.

When data is transmitted over a network between end processors as identified herein, the data may be transmitted in raw form or may be processed in whole or part at any one of the end processors or an intermediate processor, e.g., at a cloud service (e.g. where at least a portion of the transmission path is wireless) or other processor. The data may be parsed at any one of the processors, partially or completely processed or compiled, and may then be stitched together or maintained as separate packets of information. Each processor or controller identified herein may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory identified herein may be but is not limited to a random access memory (RAM), read only memory (ROM), or other electronic, optical, magnetic or any other computer readable medium.

The controller may further include, in addition to a processor and non-volatile memory, one or more input and/or output (I/O) device interface(s) that are communicatively coupled via an onboard (local) interface to communicate among other devices. The onboard interface may include, for example but not limited to, an onboard system bus, including a control bus (for inter-device communications), an address bus (for physical addressing) and a data bus (for transferring data). That is, the system bus may enable the electronic communications between the processor, memory and I/O connections. The I/O connections may also include wired connections and/or wireless connections identified herein. The onboard interface may have additional elements, which are omitted for simplicity, such as controllers, buffers (caches), drivers, repeaters, and receivers to enable electronic communications. The memory may execute programs, access data, or lookup charts, or a combination of each, in furtherance of its processing, all of which may be stored in advance or received during execution of its processes by other computing devices, e.g., via a cloud service or other network connection identified herein with other processors.

Embodiments can be in the form of processor-implemented processes and devices for practicing those processes, such as processor. Embodiments can also be in the form of computer code based modules, e.g., computer program code (e.g., computer program product) containing instructions embodied in tangible media (e.g., non-transitory computer readable medium), such as floppy diskettes, CD ROMs, hard drives, on processor registers as firmware, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims

What is claimed is:

1. An elevator system comprising:

a controller;

an elevator car operationally connected to the controller;

a first sensor configured to provide first sensor data to the controller, wherein the controller is configured to identify a capacity parameter of the elevator car, wherein the capacity parameter includes one or more of: loaded weight; volume of available space; or volume of occupied space;

a second sensor configured to provide second sensor data to the controller, wherein the controller is configured to determine that passengers remain outside the elevator car in response to the elevator car being stopped at a landing and its elevator doors are open; and wherein from the first sensor data and the second sensor data, the controller is configured to determine a reduced capacity limit for the elevator car as a function of the capacity parameter, wherein:

when determining the reduced capacity limit, controller is configured for:

accumulating data related to passengers entering the elevator car in response to hall calls while the elevator car is near its design capacity limit or previously determined reduced capacity limit;

setting the reduced capacity limit to correlate with a predetermined boarding probability and setting a tolerance range around the reduced capacity limit;

determining whether passengers enter the elevator car in response to hall calls;

upon determining that passengers enter the elevator in response to hall calls, increasing the reduced capacity limit by half the tolerance range to an upper capacity tolerance, otherwise decreasing the reduced capacity limit by half the tolerance range to a lower capacity tolerance;

determining whether the boarding probability is within acceptable limits over time; and upon determining that the boarding probability is outside of acceptable limits over time, modifying one or both of the tolerance range and the reduced capacity limit.

2. The system of claim 1, wherein the controller, the first sensor and the second sensor are configured to communicate with each other over a wireless network.

3. The system of claim 1, wherein:

the controller is configured to determine the reduced capacity limit by applying a predetermined multiplier to the capacity parameter.

4. The system of claim 1, wherein:

the capacity parameter further includes one or more of time of day, season, geographic location, occupancy type and building utilization.

5. The system of claim 1, wherein:

the controller is configured to control the elevator car to disregard calls for service in response to the elevator car being at or above the reduced capacity limit.

6. The system of claim 1, wherein:

the first sensor is located onboard the elevator car and is configured to communicate with the controller directly or via a cloud service, and the first sensor data is processed in whole or part at one or more of the first sensor, the cloud service and the controller.

7. The system of claim 6, wherein:

one or more of passenger count, the volume of available space and volume of occupied space is derived from processing the first sensor data.

8. The system of claim 6, wherein:

the second sensor is onboard the elevator car or located at the landing; and the second sensor communicates with the controller directly or via the cloud service, and the second sensor data is processed in whole or part at one or more of the second sensor, the cloud service and the controller.

9. The system of claim 8, wherein:

the second sensor is a motion sensor or depth sensor located on the landing.

10. A method of controlling an elevator car of an elevator system with a controller that is operationally connected to the elevator car, the method comprising:

identifying, at the controller from first sensor data communicated via a first sensor, a capacity parameter of the elevator car, wherein the capacity parameter includes at least one of: loaded weight; volume of available space; or volume of occupied space;

determining, at the controller from second sensor data communicated via a second sensor, that passengers remain outside the elevator car in response to the elevator car being stopped at a landing and its elevator doors are open; and determining, at the controller from the first sensor data and the second sensor data, a reduced capacity limit for the elevator car as a function of the capacity parameter, wherein:

when determining the reduced capacity limit, the method include the controller:

accumulating data related to passengers entering the elevator car in response to hall calls while the elevator car is near its design capacity limit or previously determined reduced capacity limit;

setting the reduced capacity limit to correlate with a predetermined boarding probability and setting a tolerance range around the reduced capacity limit;

determining whether passengers enter the elevator car in response to hall calls;

upon determining that passengers enter the elevator in response to hall calls, increasing the reduce capacity limit by half the tolerance range to an upper capacity tolerance, otherwise decreasing the reduced capacity limit by half the tolerance range to a lower capacity tolerance;

determining whether the boarding probability is within acceptable limits over time; and upon determining that the boarding probability is outside of acceptable limits over time, modifying one or both of the tolerance range and the reduced capacity limit.

11. The method of claim 10, wherein:

the controller, the first sensor and the second sensor communicate with each other over a wireless network.

12. The method of claim 10, wherein:

determining the reduced capacity limit includes applying a predetermined multiplier to the capacity parameter.

13. The method of claim 10, wherein:

the capacity parameter further includes one or more of time of day, season, geographic location, occupancy type and building utilization.

14. The method of claim 10, further comprising:

controlling the elevator car, by the controller, to disregard calls for service in response to the elevator car being at or above the reduced capacity limit.

15. The method of claim 10, wherein:

the first sensor is located onboard the elevator car;

the method comprising:

communicating, between the controller and the first sensor, directly or via a cloud service, and processing the first sensor data in whole or part at one or more of the first sensor, the cloud service and the controller.

16. The method of claim 15, further comprising:

determining, from the first sensor data, one or more of passenger count, the volume of available space and volume of occupied space.

17. The method of claim 15, wherein:

the second sensor is onboard the elevator car or located at the landing; and the method further comprising:

communicating, between the second sensor and the controller, directly or via the cloud service, and processing the second sensor data in whole or part at one or more of the second sensor, the cloud service and the controller.

18. The method of claim 17, wherein:

the second sensor includes a motion sensor or depth sensor located on the landing.

* * * * *